US009797550B1

(12) United States Patent
Grant et al.

(10) Patent No.: US 9,797,550 B1
(45) Date of Patent: Oct. 24, 2017

(54) APPARATUS FOR SUSPENDING ITEMS FROM A MANTEL OR SHELF

(71) Applicants: Daniel P. Grant, Lake Leelanau, MI (US); Douglas M. Schaub, Lake Leelanau, MI (US)

(72) Inventors: Daniel P. Grant, Lake Leelanau, MI (US); Douglas M. Schaub, Lake Leelanau, MI (US)

( * ) Notice: Subject to any disclaimer, the term of this patent is extended or adjusted under 35 U.S.C. 154(b) by 0 days.

(21) Appl. No.: 15/068,540

(22) Filed: Mar. 12, 2016

Related U.S. Application Data

(63) Continuation-in-part of application No. 14/694,978, filed on Apr. 23, 2015, now abandoned.

(51) Int. Cl.

| | |
|---|---|
| ***A47G 29/087*** | (2006.01) |
| ***A47H 1/08*** | (2006.01) |
| ***A47F 5/00*** | (2006.01) |
| ***F16M 13/02*** | (2006.01) |
| ***A01G 5/04*** | (2006.01) |
| ***A47G 35/00*** | (2006.01) |
| ***A47H 1/022*** | (2006.01) |

(52) U.S. Cl.
CPC ............. *F16M 13/022* (2013.01); *A01G 5/04* (2013.01); *A47F 5/0006* (2013.01); *A47G 35/00* (2013.01); *A47H 1/022* (2013.01)

(58) Field of Classification Search
CPC ....... F16M 13/022; A01G 5/04; A47F 5/0006; A47F 5/0068; A47F 3/002; A47F 5/0025; A47F 7/143; A47F 5/10; A47G 35/00; A47G 29/08; A47G 29/087; A47G 29/083; A47G 29/00; A47G 29/10; A47G 25/065; A47G 33/10; A47G 25/0607; A47G 25/0614; A47G 25/0621; A47G 25/0628; A47G 25/0635; D06F 57/12; A47K 10/10; A47K 10/08; A47K 10/12; A47H 1/022; A47H 2001/0215; A47H 1/08; A47H 1/142; A47B 45/00; A47B 96/025
USPC ............ 211/119.003, 106.01, 118, 119, 106, 211/181.1, 175, 105.3; 248/303, 304, 248/687, 690, 689, 692, 301, 339
See application file for complete search history.

(56) References Cited

U.S. PATENT DOCUMENTS

| | | | | |
|---|---|---|---|---|
| 177,936 A * | 5/1876 | Haines | A47G 25/06 | 211/106.01 |
| 556,592 A * | 3/1896 | Trachsel | B65H 49/30 | 223/106 |
| 752,203 A * | 2/1904 | Cook | A47G 25/06 | 211/106.01 |
| 1,169,056 A * | 1/1916 | Schweppenheiser et al. | A47G 25/06 | 211/106.01 |
| 1,580,706 A * | 4/1926 | Wright | A47H 1/142 | 211/105.3 |

(Continued)

*Primary Examiner* — Jennifer E Novosad
(74) *Attorney, Agent, or Firm* — Northern Michigan Patent Law, PLC

(57) ABSTRACT

A decorative accessory holder for suspending decorations such as Christmas ornaments, stockings, lights, garland and the like from a mantel or shelf. The holder comprises a telescoping rod assembly with a clamping mechanism and end leg spring members adapted to fit securely over the upper surface of a mantel under tension, with a gap between the rod assembly and the upper surface of the mantel for inserting one or more detachable decoration holders such as hooks.

9 Claims, 3 Drawing Sheets

(56) References Cited

U.S. PATENT DOCUMENTS

| | | | | | |
|---|---|---|---|---|---|
| 1,815,673 | A * | 7/1931 | Kelley | A47G 25/485 | 211/119 |
| 2,402,800 | A * | 6/1946 | Bodeman | A47H 1/022 | 211/105.3 |
| 2,583,613 | A * | 1/1952 | Talbott | A47L 3/00 | 49/465 |
| 2,985,315 | A * | 5/1961 | Paruolo | A47F 5/0876 | 211/106.01 |
| 3,252,583 | A * | 5/1966 | Walther | A47B 81/04 | 211/119 |
| 3,469,710 | A * | 9/1969 | Vosbikian | A47G 25/0678 | 211/116 |
| 3,606,711 | A * | 9/1971 | Lodato | A47H 1/08 | 211/105.3 |
| 3,664,626 | A * | 5/1972 | Sneller | A47H 1/00 | 248/214 |
| 3,730,355 | A * | 5/1973 | Feldman | A47F 5/0876 | 211/119 |
| 4,140,256 | A * | 2/1979 | King | B25H 3/04 | 206/373 |
| 4,366,774 | A * | 1/1983 | Haake | A01K 31/12 | 108/143 |
| 4,367,819 | A * | 1/1983 | Lewis | A47G 25/0678 | 211/106.01 |
| 4,378,071 | A * | 3/1983 | Yakimicki | A47H 99/00 | 211/105.4 |
| 4,425,012 | A * | 1/1984 | Kley | A47K 10/24 | 211/105.3 |
| 4,834,248 | A * | 5/1989 | Lee | A47G 25/74 | 211/113 |
| 5,092,504 | A * | 3/1992 | Hannes | B60R 9/00 | 211/17 |
| 5,137,158 | A * | 8/1992 | Brockway | B60R 7/02 | 211/106.01 |
| D360,572 | S * | 7/1995 | Adams | D8/367 | |
| 5,642,819 | A * | 7/1997 | Ronia | A47G 33/04 | 211/86.01 |
| 6,052,918 | A * | 4/2000 | Oletzke | D06F 57/12 | 211/119.004 |
| 6,233,877 | B1 * | 5/2001 | Monroe | A62B 1/04 | 182/230 |
| 6,378,827 | B1 * | 4/2002 | Kacines | A47G 29/083 | 24/546 |
| 6,398,174 | B1 * | 6/2002 | Emalfarb | A47G 7/044 | 248/214 |
| 6,789,687 | B2 * | 9/2004 | Cramer | A47G 33/10 | 211/104 |
| D568,231 | S * | 5/2008 | Frischer | D12/414 | |
| 7,988,116 | B2 * | 8/2011 | Kacines | A47G 33/04 | 248/309.1 |
| 8,474,632 | B2 * | 7/2013 | Yang | A47K 3/281 | 211/119.009 |
| D692,369 | S * | 10/2013 | Mezzanatto | D12/414 | |
| 8,770,531 | B2 * | 7/2014 | Cundy | B65B 67/1227 | 220/485 |
| 8,931,747 | B2 * | 1/2015 | Davis | F16B 1/00 | 248/214 |
| 9,010,550 | B2 * | 4/2015 | Figueroa | F16M 13/022 | 211/105.1 |
| 2001/0047974 | A1 * | 12/2001 | Berlingieri | A47F 5/0838 | 211/106 |
| 2002/0153337 | A1 * | 10/2002 | Shuen | B60R 7/10 | 211/123 |
| 2005/0000068 | A1 * | 1/2005 | Waszak | A47F 5/0068 | 24/493 |
| 2005/0082454 | A1 * | 4/2005 | Adams | A47G 29/083 | 248/304 |
| 2014/0151316 | A1 * | 6/2014 | Beach | A47F 5/01 | 211/119.003 |

* cited by examiner

APPARATUS FOR SUSPENDING ITEMS FROM A MANTEL OR SHELF

RELATED APPLICATIONS/PRIORITY BENEFIT CLAIM

This application claims priority to and is a continuation-in-part of prior U.S. patent application Ser. No. 14/694,978 filed Apr. 23, 2015 by the same inventors (Grant and Schaub), which prior application is hereby incorporated by reference.

FIELD

The subject matter of the present application is in the field of devices for suspending decorative items from the front edge of a mantel or shelf using hooks.

BACKGROUND

Many people place decorative accessory holders on the front edges of fireplace mantels to hold items such as Christmas stockings and lights, figurines, garland, strings of mistletoe and the like. One prior accessory holder takes the form of a weighted figurine with an attached hanger that extends over the front edge of the mantel. The figurine is heavily weighted to keep not only itself in place, but also to keep it from slipping off the mantel despite the weight of decorations suspended from its hanger. This weighted figurine technique applies well to all mantel surface types, including harder surfaces such as marble or granite. However, weighted figurines have a limited weight-holding capability. The weighted figurines can be accidentally pulled off a mantel by a child and damage the figurine or flooring beneath the mantel. More importantly, the falling weighted figurine could cause personal injury. This is particularly the case when a curious small child might pull at a stocking, dislodging the figurine and directing its fall toward the child. With a typical mantel height, a weighted figurine could be traveling between 6 and 10 mph when it strikes a child, and could cause injury.

Most of the currently available Christmas stocking holders are designed for the sole purpose of hanging Christmas stockings. Stringing lights, garland, and other decorations between stocking holders is not a realistic option for two reasons. First, the hooks are often too small or too awkward to use for anything other than hanging stockings. In addition, the vast majority of these products cannot support the weight of lights and garland. Even the heaviest products tend to slide out of place when items are strung from adjacent stocking holders, since they frequently slide on the mantel or shelf surface.

One prior art Christmas stocking holder is taught in U.S. Pat. No. 5,642,819 issued Jul. 1, 1997 to Ronia. The stocking holder taught in this patent consists of a plurality of C-type clamps that clamp onto the front edge of a mantel or shelf. The clamps are spaced from each other and have a rod passing underneath, supported by the C clamps.

Another prior art means for supporting articles from a mantel, shelf or similar planar surface is taught in U.S. Pat. No. 6,378,827 issued Apr. 30, 2002 to Kacines. This means of supporting articles is a one-piece metal clip that has a general C-shape with decorative additions and a point for hanging items such as Christmas stockings. When the clip is slid onto the edge of a mantel or shelf, the opening of the clip is expanded, creating a spring pressure to hold the clip on the edge of the mantel or shelf.

The above-cited prior art teaches rather complex stocking holders and ones that can be too easily be pulled from the edge of a mantel or shelf. Therefore, there is a need in the art for an improved device for securing decorative accessories hanging from the front edge of a mantel or shelf.

BRIEF SUMMARY

The present invention is a strong, simple accessory holder which can safely hold decorative accessories (e.g., strings of lights, Christmas stockings, garland, lanterns, flowers, wreaths, banners, figurines, etc.—hereafter “decorations”) hanging from the front edge of a raised support with a substantially flat front edge, perpendicular sides, and a flat upper surface, such as a fireplace mantel, a shelf, or the front edge of a table (hereafter “mantel” for convenience). The holder can be securely attached to the mantel without marring the surface, securely holds various types of decoration, and is nearly impossible to pull off, either directly or via a decoration hanging from the holder. Even if the holder were somehow to be pulled from the mantel, the holder itself is lightweight and does not pose any significant risk of damage or injury.

The inventive holder is a horizontal rod assembly comprising a main outer rod and a counterpart inner rod that telescopes into the main rod to adjust the length, with a clamping mechanism that secures the rods at a desired length under tension against the sides of the mantel. The rod ends have 90-degree-angled, downwardly-oriented vertical end legs configured to be drawn against the outside edges of the mantel, shelf, etc. under tension. Spacers are located adjacent the inner corner of the junction of the rod ends and angled legs, in one form extending inwardly from the angled legs toward the center of the rod assembly essentially parallel to and underneath the associated rod. The spacers engage the upper surface of the mantel to create a space between the lower side of the rod assembly and the upper surface of the mantel for securing an attachment means such as a hook or cord between the rod assembly and the mantel.

In a first embodiment, the clamping mechanism comprises an internal fixed female thread in one rod and an internal male threaded shaft rotatably mounted in the other rod, with an external nut or similar driver for operating the male threaded shaft. The inner faces of the angled end legs include resilient spring members located below the spacer tabs, the resilient spring members exerting a spring force when compressed against the sides of the mantel as the rods are drawn together in order to secure the rod assembly to the mantel under reliable tension.

In a second embodiment, the clamping mechanism comprises an external clamping hasp on one rod that flexibly engages an external collar on the other rod under tension.

The rod assembly in a further form includes one or more specially designed hooks, with front hook legs for supporting decorations, and rear base legs terminating in shallow upwardly curved hook ends to engage the back of the rod assembly with the base legs in a secure trapped fit between the rod assembly and the upper surface of the mantel. In a preferred form, the upwardly curved rod-engaging hook ends of the hooks subtend an arc greater than 90-degrees but less than 180-degrees.

In a further form, the hooks include vertical bores in reinforced vertical post portions of their front hook legs, and removable decorative finials with pins removably received in the vertical bores.

Terms of orientation such as horizontal, vertical, etc. with respect to the rod assembly and hooks should be considered convenient terms of relative orientation within the context of the rod itself, and when mounted on a horizontal mantel, used in order to better distinguish their relationship to one another rather than as absolute terms.

These and other features and advantages of the invention will become apparent from the detailed description below, in light of the accompanying drawings.

DETAILED DESCRIPTION

Figure 1:
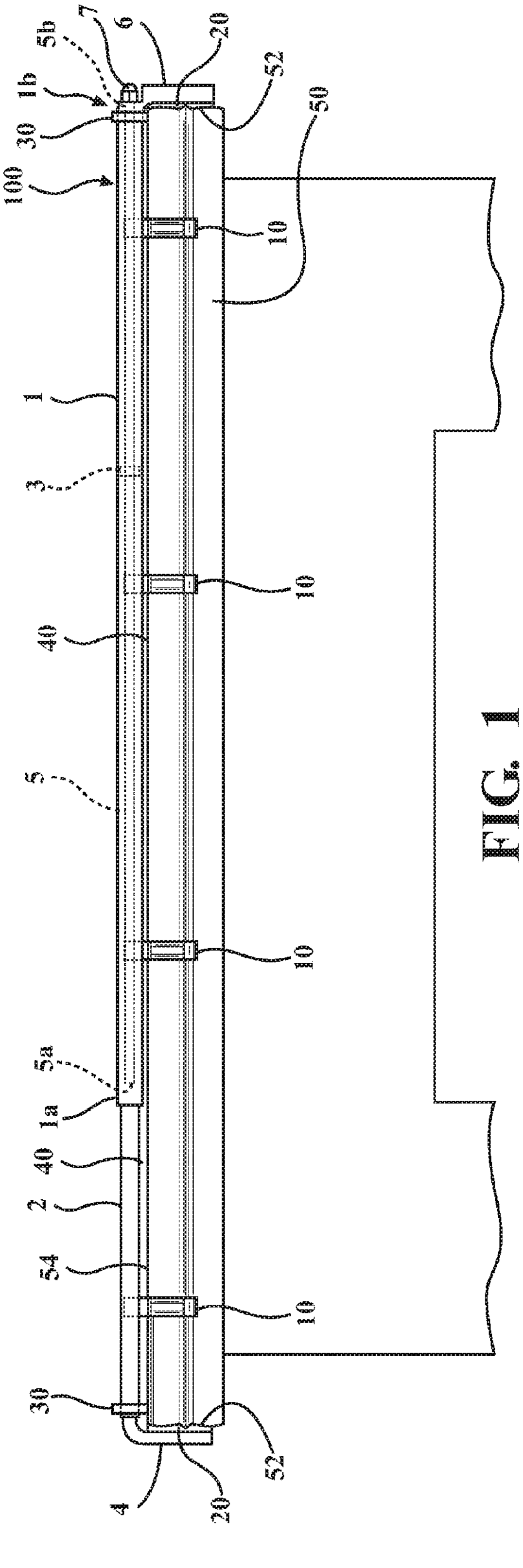
FIG. 1 is a front elevation view of an exemplary accessory holder according to the invention, mounted to a mantel.
Figure 2:
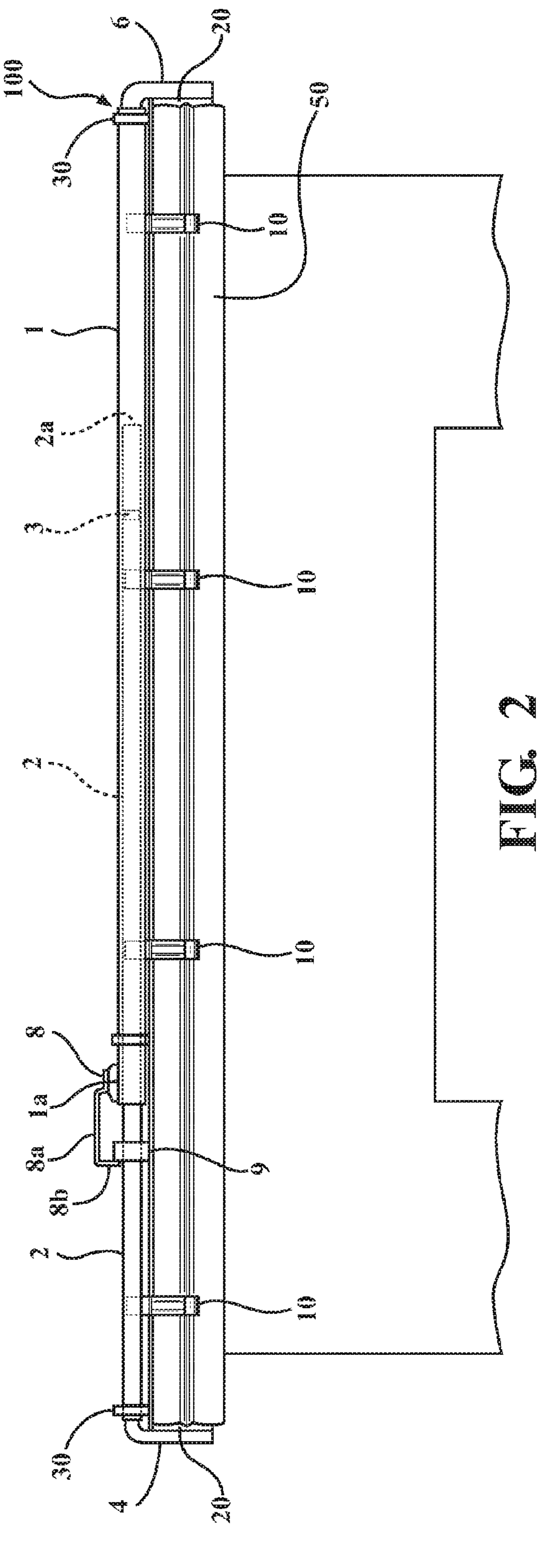
FIG. 2 is similar to FIG. 1, but shows the accessory holder rod assembly with a different clamping mechanism.
Figure 3:
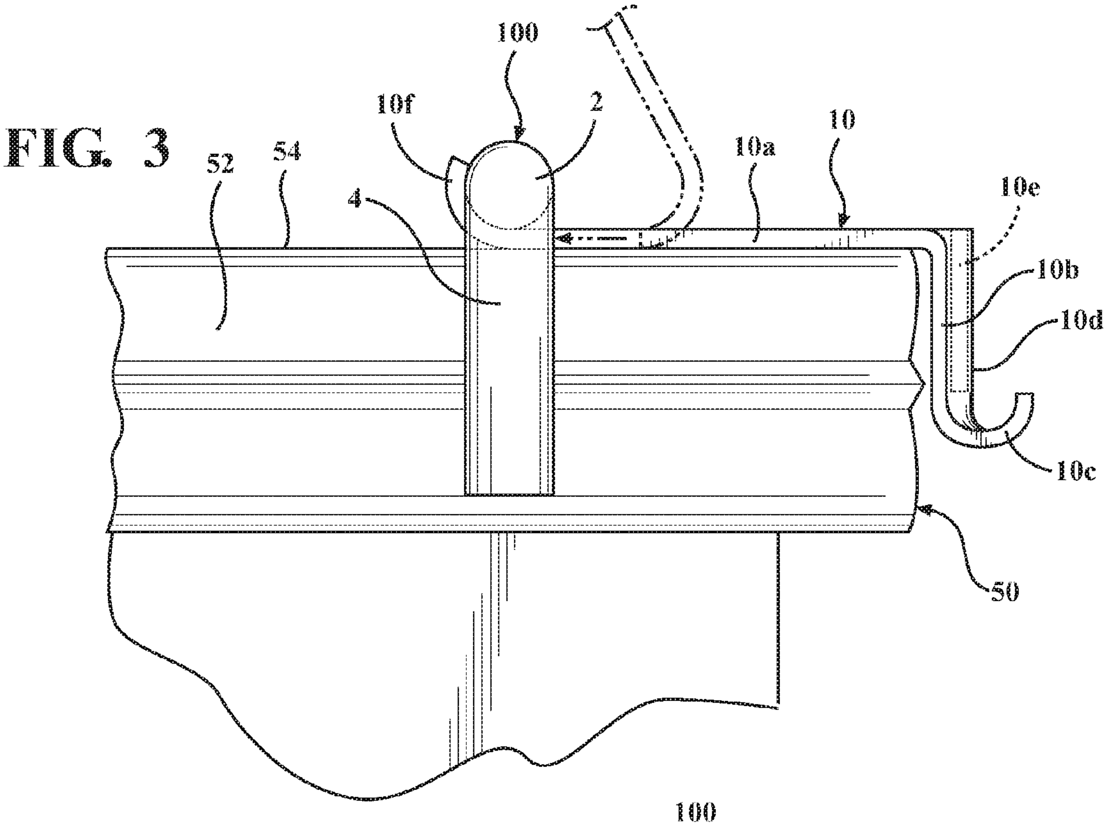
FIG. 3 is an end elevation view of the rod assembly and mantel of FIG. 1.

Referring first to FIGS. 1 through 3, an accessory holder 100 is shown in exemplary form, mounted on a mantel 50, in order to teach how to make and use the claimed invention. Holder 100 is a horizontal rod assembly comprising a main outer rod 1 and a smaller diameter counterpart inner rod 2. Inner rod 2 is telescopically mounted in rod 1 to adjust the overall length of rod assembly 100. The ends of the outer and inner rods 1 and 2 are provided with substantially identical end legs 4 and 6, the legs mounted perpendicular to the axis of the horizontal rod assembly so that they depend vertically from each end of the rod assembly when oriented to engage mantel 50. End legs 4 and 6 may be integral extensions of the rods' material, for example metal or sturdy plastic tubing, or they may be separate pieces secured to the ends of the rods. The rod components may be made from metal, plastic, wood, or various combinations thereof.

Outer and inner rods 1 and 2 can be secured in different length-adjusted positions to accommodate the width of the mantel. In the example of FIG. 1, a fixed female thread 3 such as an internal nut is located in the bore of inner rod 2, for example located at or near the inner terminal end 2*a* of inner rod 2. A correspondingly-threaded male threaded rod 5 is rotatably secured inside the outer rod 1, with its inner terminal end 5*a* threaded into and through the fixed female thread 3. The outer end 5*b* of threaded rod 5 passes through a hole in leg 6 on the outer end 1*b* of main rod 1, with a driver such as a nut or knurled cap 7 secured non-rotatably to the threaded rod 5 to rotate the threaded rod 5 in the outer rod 1.

Rotating threaded rod 5 clockwise acts through fixed female thread 3 to draw inner rod 2 farther into outer rod 1, reducing the overall length of rod assembly 100; rotating threaded rod 5 counterclockwise acts through fixed female thread 3 to extend inner rod 2 farther out of outer rod 1, increasing the overall length of rod assembly 100.

The length of the rod assembly 100 is initially adjusted in this manner so that end legs 4 and 6 fit over the respective sides 52 of mantel 50. Driver 7 is then rotated to draw rods 1 and 2, and thus their end legs 4 and 6, tightly against the sides of the mantel under tension, clamping the rod assembly 100 securely to the mantel.

FIG. 2 shows an alternate clamping mechanism in the form of a clamp hasp 8 and collar sleeve 9 secured to the outer rod 1 and inner rod 2, respectively. Clamp hasp 8 is fixed to the outer end 1*a* of rod 1, and comprises a flexible spring arm 8*a*, for example made from a thin metal or flexible plastic, with a catch 8*b* configured to catch the collar sleeve 9 on the inner rod. Collar sleeve 9 slides over the inner rod 2 and can be tightened in a desired location, for example with a set screw, to provide a firm anchor for the catch 8*b* on clamp hasp 8. Clamp hasp 8 clamps onto collar sleeve 9 as illustrated, under tension given the flex of the spring arm and/or catch, and tensions the inner rod 2 relative to outer rod 1 to fix the length of the rod assembly and tighten the end legs 4 and 6 against the sides of the mantel under tension, securing the rod assembly firmly to the mantel.

Figure 4:
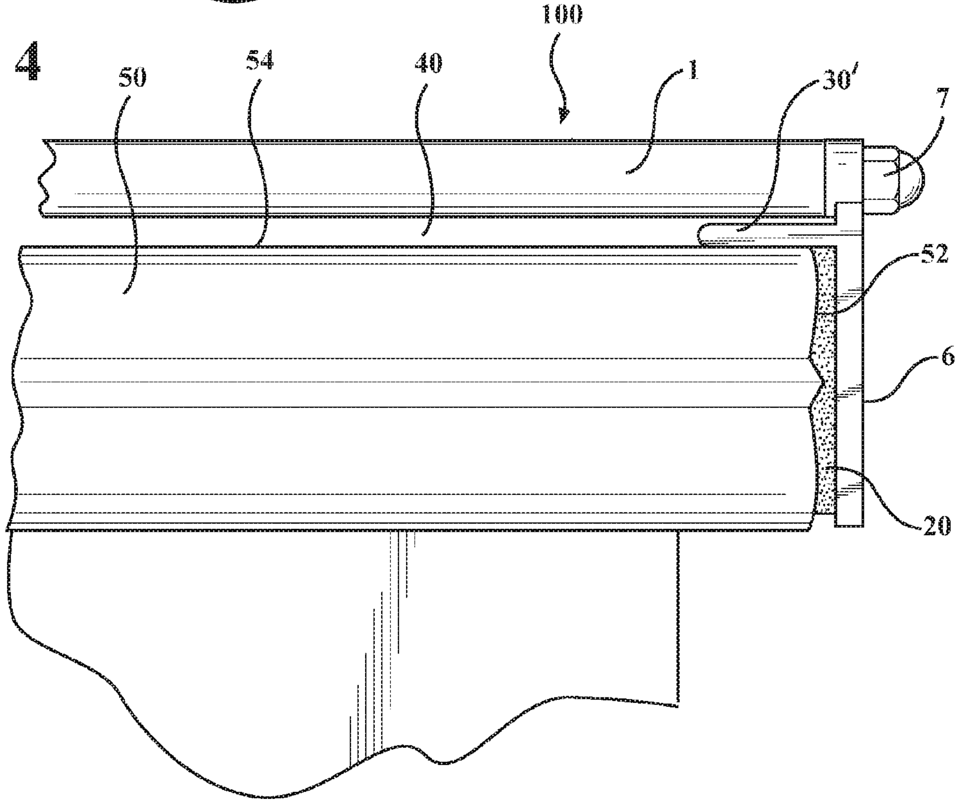
FIG. 4 is a detail front view of one of the rod assembly ends of FIG. 1 where it is clamped to the mantel.

Referring now to FIGS. 1, 2 and 4, the inner faces of end legs 4 and 6 are provided with resilient spring members 20, for example firm rubber or foam pads that compress resiliently to function as a spring under compression as the legs are drawn against mantel sides 52. The compressed spring resistance of resilient members 20 against the tension of rod assembly 100 on the mantel results in a strong tensioned fit without loosening over time due to creep, fatigue, or vibration. While resiliently compressible foam pads are illustrated for spring members 20, it will be understood that other types of resilient spring member could be used in place of the pads, for example short coil or leaf springs.

FIGS. 1, 2 and 4 also show spacer members 30, 30' on the rod assembly for maintaining a gap 40 between the upper surface 54 of the mantel and the rod assembly sufficient for decoration support hooks 10 to be secured therebetween. In FIG. 1, spacers 30 are collars located on the ends of rods 1 and 2 adjacent legs 4 and 6, the spacers having outer diameters greater than the outer rod 1 to keep the rods above the mantel surface. In FIG. 4, the spacers 30' are tabs extending inwardly from the inner faces of legs 4 and 6 near their junctions with the rod ends, the tabs having a thickness sufficient to maintain gap 40 for hooks 10.

Referring next to FIGS. 3 and 4, hooks 10 include a flat horizontal body 10*a* configured to sit flat against the surface 54 of the mantel 50, a vertical front leg 10*b* with a decoration-supporting hook portion 10*c*, and an upwardly curved rod-engaging rear hook portion 10*f* with a thickness designed to fit under the front side of the rod assembly 100 through gap 40 and to rotate upwardly to secure the hook to the corresponding rod. The arc subtended by the rear hook portion 10 is greater than 90-degrees but less than 180-degrees, ensuring both ease of engagement with the rod and a secure attachment once main hook body 10*a* is rotated down flat onto the mantel.

The vertical front leg 10*b* of hook 10 includes a thickened post portion 10*d*, for example with a rounded or wedge-shaped front face. Post portion 10*d* includes a bore 10*e* opening at the upper end of the vertical leg. Bore 10*e* receives a correspondingly-sized pin or post to mount a finial-type decoration vertically at the front of the mantel. In the illustrated example of FIG. 5, star-shaped Christmas ornaments 60 are provided with mounting stems 62 sized to fit into bores 10*e* in the hooks 10. Other vertical "finial" type decorations are possible, for example small flags or pennants.

Once secured under the rod assembly, hooks 10 are frictionally secured in place, although they may generally be moved or re-positioned along the length of the rod assembly by sliding them with sufficient force between the rod and mantel, or by first loosening the rod assembly.

Description of Operation

Figure 5:
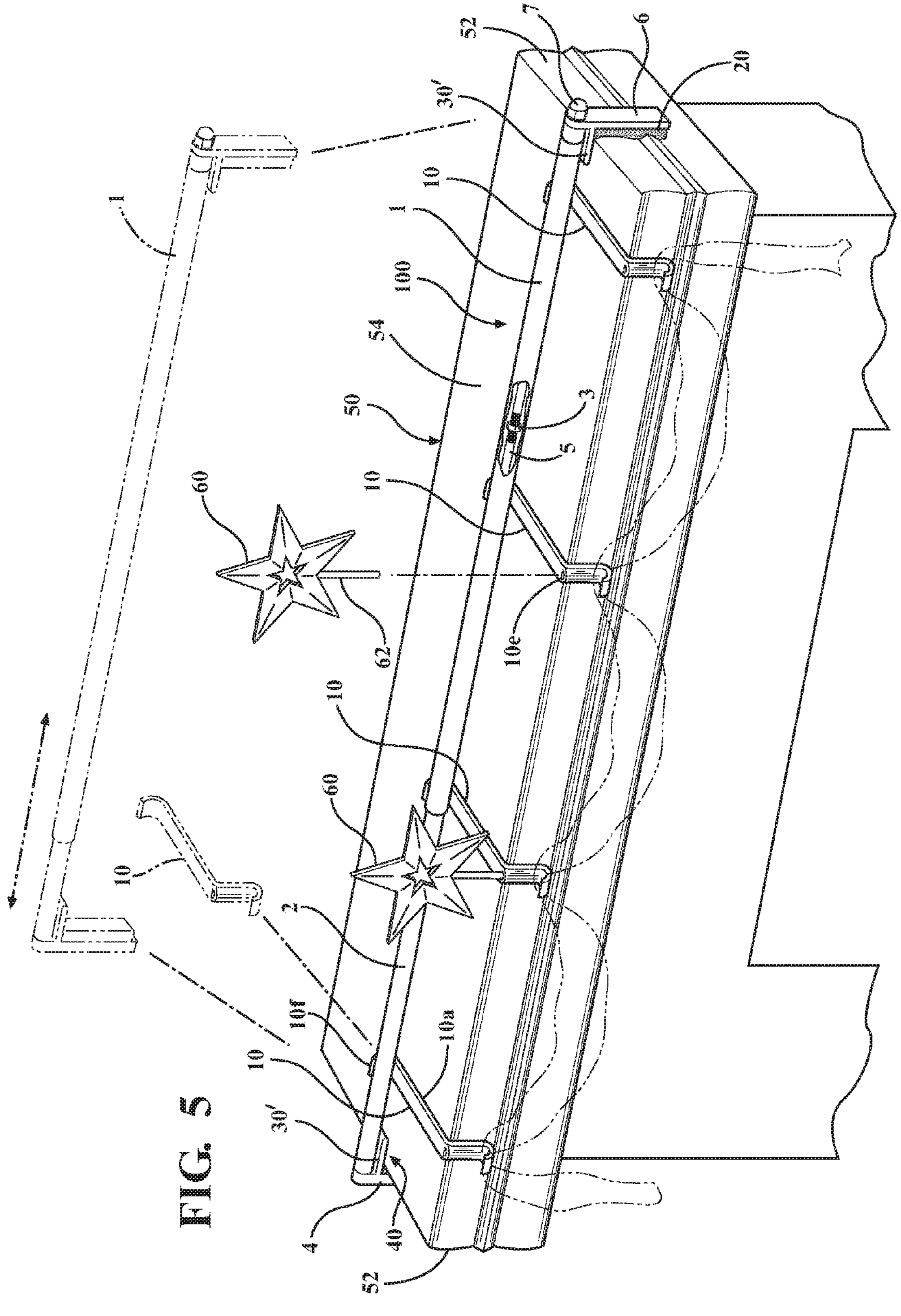
FIG. 5 is a perspective front view of the accessory holder of FIG. 1 on the mantel.

As best shown in FIG. 5, in operation the rod assembly 100 is adjusted lengthwise to fit the width of mantel 50, and rods 1 and 2 are drawn together with the length adjustment mechanism 7 to tension the end legs 4 and 6 against mantel sides 52, with resilient spring members 20 on the legs compressed. Rear rod-engaging ends 10*f* of the hooks are inserted between the rod assembly and the mantel through gap 40 at an angle, and the hooks are rotated until their horizontal main body portions 10*a* lie flat against the mantel surface. Decorations such as Christmas stockings, lights, etc. can then be hung securely from hooks 10 as shown, and/or vertical finial decorations such as ornaments 60 can be mounted in the post portions of the front ends of the hooks.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A decorative accessory holder for securing hanging decorations to a mantel or similar raised platform having a front edge, an upper horizontal surface, and two perpendicular sides, the decorative accessory holder comprising:

a horizontal rod assembly comprising an outer rod and an inner rod that telescopes into and out of the outer rod to adjust a length of the rod assembly;

a clamping mechanism on the rod assembly for securing the inner rod to the outer rod in a length-adjusted position under tension;

a first vertical end leg at an outer end of the outer rod, and a second vertical end leg at an outer end of the inner rod, the first and second end legs extending downward substantially perpendicular to the rod assembly;

a spacer located adjacent an inner corner junction of the outer ends of each of the rods and a corresponding one of the first and second end legs, each of the spacers having at least a portion located beneath the outer end of each respective rod and configured to engage the upper surface of the mantel or similar raised platform to create a gap between a lower side of the rod assembly and the upper surface of the mantel or similar raised platform for inserting a decoration-suspending attachment between the rod assembly and the mantel or similar raised platform; and, a resilient spring member on an inner face of each end leg, the resilient spring member being compressible against the inner face of the respective end leg; and, further comprising a detachable hook configured to be secured between the rod assembly and the upper surface of the mantel or similar raised platform, the hook comprising a flat main horizontal body, a front vertical leg depending downwardly substantially perpendicular to the horizontal body, an upward-facing front decoration hook portion, and an upward-facing rod-engaging hook portion having an effective diameter corresponding to a diameter of a portion of the rod assembly and subtending an arc greater than 90-degrees and less than 180-degrees.

2. The apparatus of claim 1, wherein the spacers extend inwardly from their respective end legs toward the center of the rod assembly essentially parallel to and spaced from the rod assembly.

3. The apparatus of claim 1, wherein each of the spacers comprises a collar mounted on the outer end of each respective rod, the collar having an outer diameter greater than an outer diameter of the rod assembly.

4. The apparatus of claim 1, wherein the clamping mechanism comprises a threaded rod rotatably secured in the outer rod engaging a female thread fixed in the inner rod, and a driver on the outer rod for rotating the rotatable threaded rod.

5. A decorative accessory holder for securing hanging decorations to a mantel or similar raised platform having a front edge, an upper horizontal surface, and two perpendicular sides, the decorative accessory holder comprising:

a horizontal rod assembly comprising an outer rod and an inner rod that telescopes into and out of the outer rod to adjust a length of the rod assembly;

a clamping mechanism on the rod assembly for securing the inner rod to the outer rod in a length-adjusted position under tension;

a first vertical end leg at an outer end of the outer rod, and a second vertical end leg at an outer end of the inner rod, the first and second end legs extending downward substantially perpendicular to the rod assembly;

a spacer located adjacent an inner corner junction of the outer ends of each of the rods and a corresponding one of the first and second end legs, each of the spacers having at least a portion located beneath the outer end of each respective rod and configured to engage the upper surface of the mantel or similar raised platform to create a gap between a lower side of the rod assembly and the upper surface of the mantel or similar raised platform for inserting a decoration-suspending attachment such as a hook or cord between the rod assembly and the mantel or similar raised platform;

a resilient spring member on an inner face of each end leg, the resilient spring member being compressible against the inner face of the respective end leg; and, a hook comprising a rear end configured to engage the rod assembly, a flat main horizontal body, and a front vertical hook leg depending downwardly substantially perpendicular to the horizontal body, wherein the front vertical leg comprises a post portion including a vertical bore opening at an upper end of the vertical leg.

6. The apparatus of claim 5, further comprising a finial decoration comprising a decorative body and a mounting stem, the mounting stem configured to be inserted in the vertical bore of the post portion of the front vertical leg.

7. In combination with a mantel or similar raised platform having a front edge, an upper horizontal surface, and two perpendicular sides, a decorative accessory holder secured to the mantel or similar raised platform comprising:

a horizontal rod assembly secured to the mantel or similar raised platform adjacent the front edge and above the upper surface with a gap between the rod assembly and the upper surface, the rod assembly comprising an outer rod and an inner rod that telescopes into and out of the outer rod to a length-adjusted position fitting a width of the mantel or similar raised platform along the front edge;

a clamping mechanism on the rod assembly securing the inner rod to the outer rod in the length-adjusted position under tension;

a first vertical end leg at an outer end of the outer rod, and a second vertical end leg at an outer end of the inner rod, the first and second end legs extending downward substantially perpendicular to the rod assembly and engaging the sides of the mantel or similar raised platform under tension from the clamping mechanism;

a decoration-suspending attachment inserted between the rod assembly and the mantel or similar raised platform and secured to the rod assembly and extending over the front edge of the mantel or similar raised platform;

a resilient spring member on an inner face of each end leg, the resilient spring member being compressed between the inner face of the end leg and a corresponding one of the perpendicular sides of the mantel or similar raised platform; wherein, the decoration-suspending attachment comprises a detachable hook secured between the rod assembly and the upper surface of the mantel or similar raised platform; and, wherein, the hook comprises a flat main horizontal body secured against the upper surface of the mantel or similar raised platform, a front vertical leg depending downwardly substantially perpendicular to the horizontal body at a front end of the horizontal body, an upward-facing front decoration hook portion at a lower end of the front vertical leg, and an upward-facing rod-engaging hook portion having an effective diameter corresponding to a diameter of a portion of the rod assembly and subtending an arc greater than 90-degrees and less than 180-degrees.

8. The combination of claim 7, wherein the front vertical leg comprises a post portion including a vertical bore opening at an upper end of the vertical leg, and further comprising a finial decoration comprising a decorative body and a mounting stem, the mounting stem inserted in the vertical bore of the post portion of the front vertical leg.

9. The combination of claim 7, further comprising a spacer located adjacent an inner corner junction of the outer ends of each of the rods and its corresponding first or second end leg, the spacer having at least a portion located beneath the outer end of each respective rod and engaging the upper surface of the mantel or similar raised platform to maintain the gap between the rod assembly and the upper surface of the mantel or similar raised platform.

* * * * *